United States Patent [19]
Lang et al.

[11] Patent Number: 5,655,636
[45] Date of Patent: Aug. 12, 1997

[54] COMPACT ACTUATOR INCLUDING RESETTABLE FORCE LIMITING AND ANTI-BACKDRIVE DEVICES

[75] Inventors: David J. Lang, Rockford; Gary D. Gillingham, Cherry Valley, both of Ill.

[73] Assignee: Sundstrand Corporation, Rockford, Ill.

[21] Appl. No.: 460,366

[22] Filed: Jun. 2, 1995

[51] Int. Cl.⁶ .................................. F16H 27/02
[52] U.S. Cl. ................. 192/7; 188/134; 74/89.15; 74/424.8 R
[58] Field of Search .............. 192/7, 8 R; 188/134; 74/89.15, 424.8 R

[56] References Cited

U.S. PATENT DOCUMENTS

| | | | |
|---|---|---|---|
| 3,367,456 | 2/1968 | Bohnhoff | 188/134 |
| 3,497,044 | 2/1970 | Kalns | 192/8 R |
| 3,542,162 | 11/1970 | Kerr | 188/134 |
| 3,596,740 | 8/1971 | Nau | 188/134 |
| 3,734,253 | 5/1973 | Derossi | 192/8 R |
| 3,802,281 | 4/1974 | Clarke | 74/89.15 |
| 3,968,705 | 7/1976 | Amano et al. | 74/424.8 R |
| 4,318,304 | 3/1982 | Lang | 74/89.15 |
| 4,459,867 | 7/1984 | Jones | 74/89.15 |
| 4,850,458 | 7/1989 | Allan et al. | 188/134 |

*Primary Examiner*—Richard M. Lorence
*Assistant Examiner*—Saúl J. Rodríguez
*Attorney, Agent, or Firm*—Lawrence E. Crowe

[57] ABSTRACT

A compact ball screw type actuator having both load limiting capability above a pre-determined value and position holding capability at all load values above, below and at the pre-determined value is provided through use of a resettable force limiting assembly acting directly on an element of the ball screw, in conjunction with a friction drag device operating directly upon an input shaft operatively coupled through a crossed-helical gear train to the ball screw. The force limiter utilizes axial force on the ball screw above the pre-determined value for engaging clutch teeth to limit the force applied by the ball screw, or to provide the position holding function and for preventing backdriving of the actuator. For force levels at or below the pre-determined value, the input drag device provides the position holding function.

16 Claims, 4 Drawing Sheets

COMPACT ACTUATOR INCLUDING RESETTABLE FORCE LIMITING AND ANTI-BACKDRIVE DEVICES

FIELD OF THE INVENTION

This invention relates to an actuator including a resettable force limiting assembly and a drag element which cooperatively prevent backdriving of the actuator at force levels above and below a predetermined force limit.

BACKGROUND

The term actuator refers to a member of a class of mechanisms whose primary function is to provide a controllable force for moving an actuated element to a desired position. The actuator, the actuated element, any interconnecting linkage, and a power source comprise an actuator system. In addition to moving the actuated element, some actuator systems must also perform both a force limiting function to prevent damage should the system become jammed, and a position holding function to prevent forces generated by the actuated element from backdriving the actuator.

An aircraft flight control surface actuation system is an example of an actuation system requiring both a force limiting and position holding function. Without the force limiting function, the aircraft structure or the flight control surfaces themselves could be seriously damaged if the actuator continues to exert force after the system becomes jammed. Furthermore, the control surfaces are subjected to large aerodynamic loads during aircraft flight which can backdrive the actuation system, thereby allowing the control surfaces to shift from the desired position, absent some device in the actuation system for providing the position holding function. If the control surfaces shift from the desired position, the flight characteristics of the aircraft can be significantly impaired.

Actuators that convert rotary motion from a drive motor into linear motion of a reciprocating output member for moving an actuated element, such as an aircraft control surface, to a desired position often utilize recirculating ballscrews. Ballscrews provide large forces, due to the mechanical advantage of the screw, coupled with high power transmission efficiency gained through the low friction operation of the balls. This ability to generate high forces coupled with low friction operation generally require the addition of force limiting and position holding features where a ballscrew is utilized in an actuator of a highly loaded actuated element, such as a control surface of an aircraft.

Prior ball-screw type actuators have utilized a number of approaches to provide the necessary force limiting and position holding functions. Generally, however, prior ballscrew actuators utilized some form of a so-called "no-back" device located about the ball-screw shaft centerline. These no-backs have typically been relatively complex and bulky arrangements of friction plates, ratchet and pawl mechanisms, or ball-ramp driven torque limiting devices. U.S. Pat. No. 3,802,281 to Clarke is illustrative of this approach.

In other approaches, the drive motor is coupled to an input shaft of the actuator, with the input shaft being in turn coupled to drive the ball-screw via an irreversible gearset. Such a gearset can be provided by a crossed helical gear pair having a driven gear disposed about the centerline of the ballscrew and a drive gear attached to an input shaft oriented at a right angle to the ballscrew. If the drive gear is large enough in diameter in comparison to the driven gear, such a gearset is irreversible, i.e. the driven gear cannot backdrive the drive gear even if the ballscrew is axially loaded. Although such irreversible gearsets do provide the desired position holding function, the large drive gear diameter precludes their use in actuators which must be physically compact.

Prior actuators have sometimes also utilized torque limiting devices on their input shafts for providing the force limiting function. In such devices, the torque limiter locks the input against further rotation, or decouples the input when excessive axial force on the ballscrew causes the input torque to rise above a predetermined maximum valve. Experience has shown, however, that input torque limiters are prone to nuisance trips, due to their inability to compensate for inertia spikes or variations in drag torques, etc., that are inherently encountered during start-up of the actuator.

One prior ball-screw type actuator which provides a resettable force limiting function without resorting to the complex or bulky apparatus described above is illustrated by commonly assigned U.S. Pat. No. 4,459,867 to Jones. When an axial load on the ballscrew of Jones '867 exceeds a predetermined maximum value, belleville springs in the force limiter assembly of Jones' actuator allow the lead screw portion of the actuator to move axially and cause engagement of raked teeth on reaction plates. Full engagement of the teeth transfers force from the leadscrew to a housing of the actuator, thereby effectively locking the lead screw against further motion. By eliminating the ratchets, ball ramps, friction plates and input torque limiters of other prior actuators, Jones '867 provides an actuator which is more compact and reliable. Although the force limiter assembly of Jones '867 provides both a force limiting and a partial position holding function above the predetermined maximum force limit, after lock-up of the force limiter assembly, it provides neither of these functions below the maximum force limit and prior to lock-up of the force limiter.

In summary, most prior approaches to providing both a force limiting and a position holding function in a ball-screw type actuator have been too bulky for use in compact actuators. Input torque limiters have not been reliable. While the mechanism of Jones '867 provides a both force limiting and a partial position holding function above a maximum force limit more simply and in a smaller physical space than other prior ball-screw actuators, the force limiter of Jones provides neither function at axial loads below the maximum force limit. Such a force limiting mechanism by itself would thus not be capable, for instance, of maintaining the position of an aircraft control surface subjected to aerodynamic loads large enough to backdrive the actuator, but below the maximum force limit.

Therefore, it is an object of our invention to provide a compact actuator which will reliably provide both the required load limiting and position holding functions at all potential axial load levels which may be imposed on a reciprocating output member of the actuator. Further objects of our invention include providing:

1) an actuator as above, utilizing the load-limiting mechanism of Jones '867;

2) an actuator as above which does not require an input torque limiter;

3) an actuator as above which is suitable and adapted for use in a control surface actuation system for an aircraft;

4) an actuator as above which can be manufactured at low cost; and 5) a ballscrew type actuator as in 1-4 above.

SUMMARY

Our invention provides such an actuator through the use of a load limiter similar to the load limiter of Jones '867 in conjunction with a continuously acting friction drag device coupled internally between the actuator housing and input shaft. The load limiter of our invention differs from Jones '867, however, in that we have added back-side contacting faces to clutch teeth of the load limiter which engage whenever backdriving forces exceed the maximum force limit. Therefore, above the maximum force limit the load limiter and the drag device act in unison to provide the position holding function. Below the maximum force limit, the position holding function is provided by the drag device. Thus, our actuator provides both the force limiting and position holding functions at all axial force levels above, below and at the maximum force level which triggers engagement of the force limiter.

Because the force limiter and drag device of our invention work together to provide the position holding function above the maximum force limit, our drag device is smaller than it would otherwise have to be in order to prevent backdriving of the actuator. Also, by judicious placement of the drag device at the input rather than the output end of the actuator, we are also able to utilize inherent mechanical advantages and inefficiencies in gear trains, etc., within the actuator to further reduce the size of the drag device from what it would otherwise have to be if it were located at the actuator output end. Our actuator is thus more compact and less complex than prior actuators, thus making it ideal for applications in which small size and high reliability at low cost are required, such as in a control surface actuation system for an aircraft.

Specifically, our invention provides an actuator for converting a reversible rotating torque into a linear force exerted by a force transmitting reciprocating output member of the actuator to thereby position any actuated element operatively attached to the reciprocating output member. Our actuator includes force limiting means for reacting the input torque within the actuator in a manner preventing further exertion of the linear force on the actuated member whenever the reciprocating output member experiences tension or compressive forces in the direction of the linear motion that are above a pre-determined value. Our actuator also includes position holding means for preventing backdriving of the input by tension or compression forces exerted on the output member by the actuated element above, below, or at the pre-determined value. The position holding means of our actuator are operatively configured to prevent backdriving of the input regardless of the presence or absence of the input torque.

According to one aspect of our invention, the force limiting means are configured to engage only during application of the torque input, and such that having engaged due to application of that torque input in one direction of rotation while the output member was experiencing tension or compressive forces above the pre-determined value, the torque input is locked against further rotation in the one direction of rotation, reverse rotation of the input torque being required for disengaging and resetting the force limiting means. The position holding means, however, are operatively configured to operate continuously to prevent backdriving of the input regardless of the presence or absence of the input torque. There is thus no need for applying or reversing torque in order to reset the position holding means as in some prior actuators.

According to another aspect of our invention, the actuator includes a force transmitting reciprocating output member drivingly carried by an actuating member mounted for rotation about an axis within a housing. A reversible torque input is operatively coupled to the actuating member to cause the output member to translate along the axis in a direction dependent upon a direction of rotation of the input. Force limiting means are operatively coupled between the actuating member and the housing for reacting input torque into the housing when axially directed tension or compressive forces above a pre-determined value are experienced by the output member. Reverse rotation of the input torque results in the release of the force limiting means, thereby resetting the force limiting means. Position holding means including friction drag means are operatively connected between the input and the housing for imposing sufficient continuous friction drag torque on the input to prevent axially directed tension or compressive forces experienced by the output member at or below the pre-determined value from backdriving the input of the actuator.

In a preferred embodiment of our invention, the force limiting means includes a reciprocating reaction plate secured for rotation with said actuating member, and reaction plate engagement means having elements secured against rotation to the housing and disposed on either side of the reaction plate. The reaction plate engagement means include resilient means coupled to the elements for normally resiliently separating the elements from the reaction plate while allowing the elements to individually move toward and away from the reaction plate. The reaction plate engagement means further include reaction plate positioning means operatively coupled between the actuating member and the housing whereby the tension or compression forces above the pre-determined value experienced by the output member result in the reaction plate being deflected into engagement with one of the elements of the reaction plate engagement means.

In a highly preferred version of the embodiment described in the preceding paragraph, the reaction plate and elements of the reaction plate engagement means also include normally spaced apart matching sets of clutch teeth. The clutch teeth have a front side thereof configured to provide complimentary negative rake angles such that upon an engagement of the front sides of the clutch teeth while the actuator is receiving torque from the input, the reaction plate and the elements are drawn axially toward one another, with the engagement of the clutch teeth thereby reacting additional input torque into the housing to limit the force exerted by the output member. The clutch teeth are further configured to have a back-side thereof which provides a positive rake angle such that upon an engagement of the back-side of the clutch teeth while the actuator is not receiving input torque from the input, the engagement of the clutch teeth reacts the axially directed tension or compressive force above the pre-determined value into the housing, thereby preventing those tension or compressive forces from backdriving the input of the actuator or causing further axially motion of the output member.

According to another aspect of our invention, the input includes an input shaft journaled for rotation in the housing and including integral therewith a drive gear having gear teeth. The reaction plate is further configured as a driven gear having mating gear teeth in a gear mesh relationship with the gear teeth of the drive gear. The input shaft and the drive and driven gears thereby provide the operative coupling between the input and the actuating member.

According to another aspect of our invention, the friction drag means of the position holding means includes a stationary member secured against rotation to the housing, and a rotating member secured to the input shaft for rotation therewith. Friction producing means are disposed between faying surfaces of the stationary and rotating members. Resilient spring means are operatively disposed between the input shaft and the housing for urging the rotating and stationary members of the friction drag means into contact with the friction producing means. In a highly preferred embodiment according to this aspect of our invention, the friction producing means is a skewed roller thrust bearing.

Other objects, aspects, and advantages of our invention will become readily apparent upon consideration of the following drawings and detailed descriptions of the preferred embodiments.

DESCRIPTION OF THE PREFERRED EMBODIMENT

Figure 1:
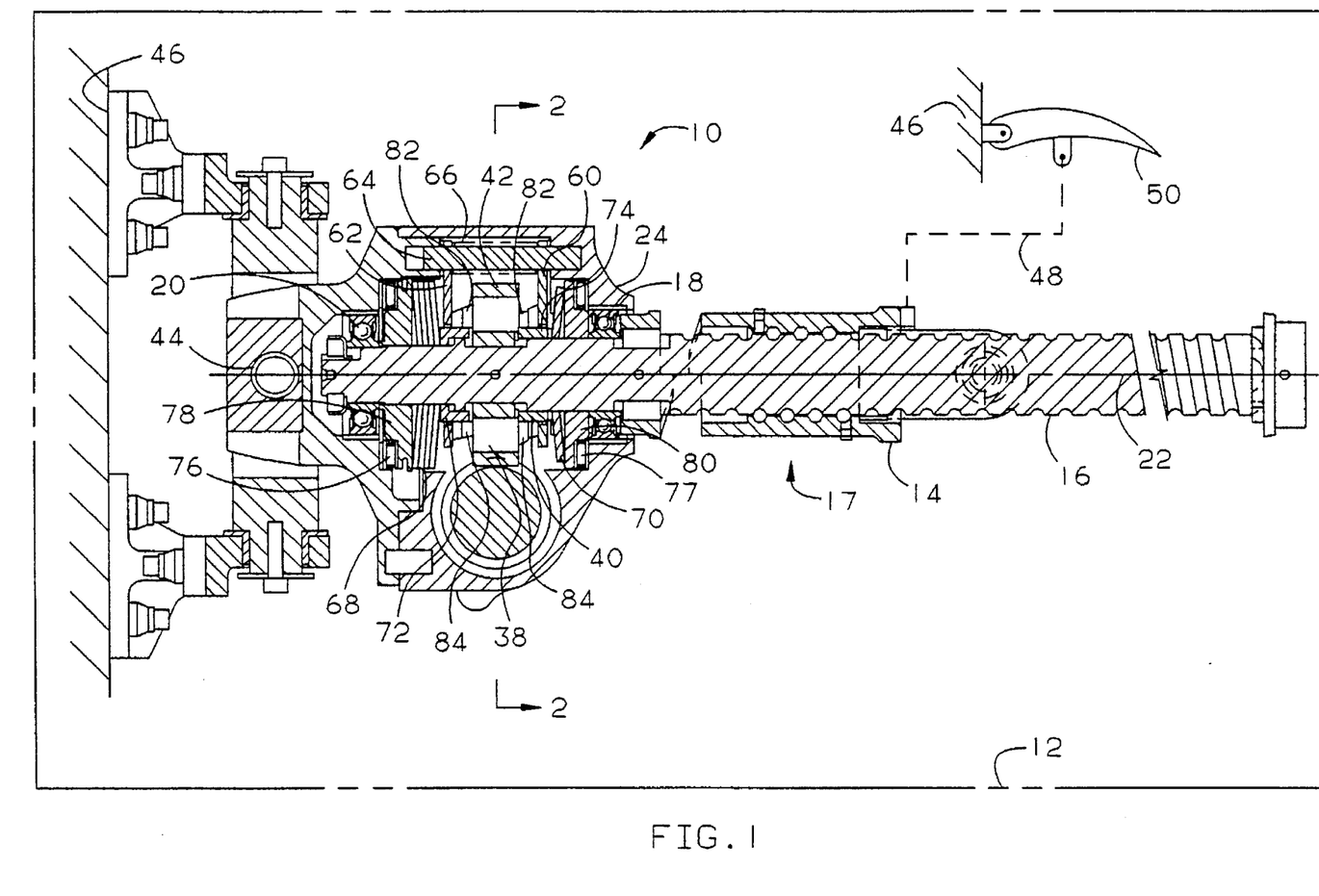
FIG. 1 is a cross-sectional view of an actuator according to our invention in a flight control surface actuation system of an aircraft.
Figure 2:
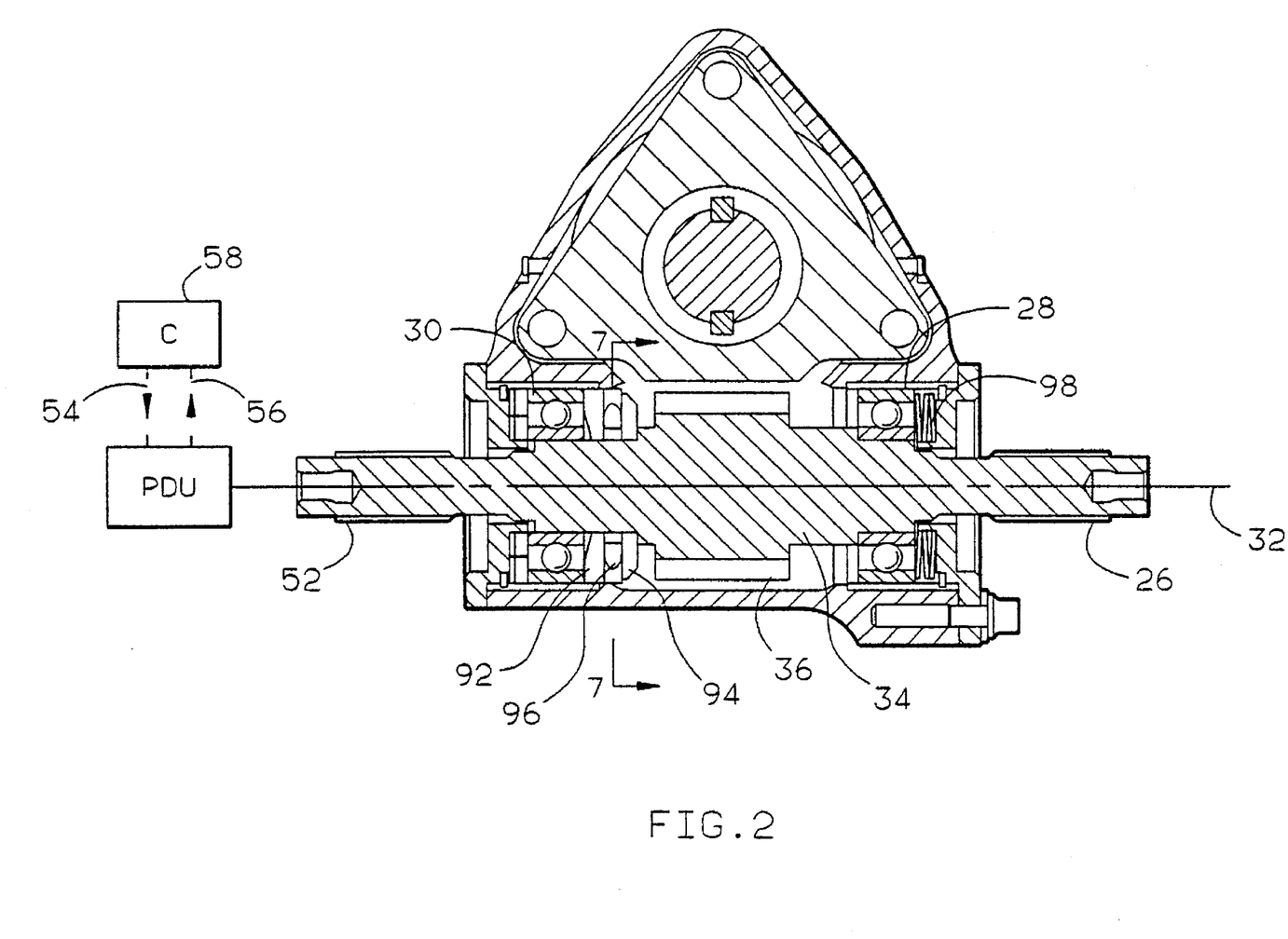
FIG. 2 is a transverse cross-sectional view of the actuator of FIG. 1 taken along section line 2—2.

FIG. 1 depicts an exemplary embodiment of an actuator 10 according to our invention in a flight control surface actuation system of an aircraft 12. The actuator 10 includes a force transmitting reciprocating output member, in the form of a recirculating ball nut 14 of conventional construction, carried by an actuating member in the form of a lead screw 16 which is journaled in bearings 18, 20 for rotation about an axis 22 within a housing 24. The ball nut 14 and lead screw 16 in combination thus constitute a recirculating ball-screw device 17 of conventional construction. As shown in FIG. 2, a reversible torque input is provided by an input shaft 26 journaled for rotation by bearings 28, 30 in the housing 24 for rotation about a second axis 32 which is oriented at a right angle to the first axis 22. The input shaft 26 includes integral therewith a drive gear 34 having helical gear teeth 36 disposed about its outer periphery. Returning to FIG. 1, a driven gear 38 is secured for rotation with the lead screw by a spline 40 or other similar means. The driven gear 38 includes mating helical gear teeth 42 on its outer periphery disposed in a gear mesh relationship with the gear teeth 36 of the drive gear 34, thereby providing operative coupling between the input shaft 26 and the lead screw 16. As shown in FIG. 1, the left end of the housing 24 includes an appurtured ear 44 for attaching the actuator to an airframe 46 of the aircraft 12. The ball nut 14 of the actuator is connected by a linkage shown schematically as reference number 48 to a control surface 50 that is pivotably attached to the airframe 46 in such a manner that linear motion of the recirculating ball nut 14 along the lead screw 16 will, via linkage 48, move the control surface 50 to a desired position. The control surface 50 is also referred to herein as an actuated member. As shown in FIG. 2, the left end of 52 of the input shaft 26 is adapted to receive a reversible torque input from a power drive unit (PDU) of the flight control surface actuation system of the aircraft 12. The control surface actuation system also includes a control unit C which provides position control signals 54 to the PDU in response to position sensor signals 56 provided by the PDU, and external command signals 58 from the aircraft 12.

With reference to FIGS. 1 and 2, it will be seen therefore that overall operation of the flight control actuation system is as follows. When the control unit C receives an external command signal 58 from the aircraft 12, the control unit C sends a control signal 54 to the PDU causing it to apply an input torque to the input shaft 26. Rotation of the input shaft 26 about the second axis 32 is transmitted in conventional fashion via the drive and driven gears 34, 38, the lead screw 16 and ball nut 14, and the linkage 48 to reposition the control surface 50. When the control surface 50 is moved to the desired position, the position sensor signal 56 will cause the control unit to command the PDU to discontinue applying input torque to the input shaft 26.

In the event that one of the elements in the flight control surface actuation system should jam, however, the actuator 10 of our invention includes force limiting means operatively connected between the lead screw 16 and the housing 24 for reacting input torque from the PDU into the housing 24 when axially directed tension or compressive forces above a pre-determined value are experienced by the recirculating ball nut 14. Specifically, with reference to FIG. 1, the force limiting means include the driven gear 38, and reaction plate engagement means having elements in the form of internal stop rings 60, 62 that are mounted within the housing 24 to be axially movable along axis 22, but secured against rotation to said housing 24 by pin 64. One internal stop ring 60, 62 is disposed on each side of the driven gear 38. A helical compression spring 66 is disposed about pin 64 between the stop rings 60, 62 for normally resiliently separating the stop rings 60, 62 from the driven gear 38, while allowing the stop rings 60, 62 to individually move toward and away from the driven gear 38.

Opposed belleville washer stacks 68, 70 act through spacers 72, 74, thrust bearing 76, 77, and retainers 78, 80, to maintain the driven gear 38 in a normally centered position between the stop rings 60, 62. The bearings 18, 20 which support the lead screw 16 are slidably mounted within the housing 24 in such a manner that axial tension or compression forces transferred to the lead screw 16 from the recirculating ball nut 14 will urge the lead screw 16 to move axially along axis 22. Such axial movement causes the driven gear 38 to move toward one or the other of the reaction plates 60, 62. The belleville washer stacks 68, 70 are specifically selected such that axial movement of the lead screw 16 is resisted until a maximum pre-determined axial tension or compression force is experienced by the ball nut 14, at which point the axial force overcomes the spring force exerted by the belleville washers stacks 68, 70, thereby causing the lead screw 16 and driven gear 38 to move toward one or the other of the stop rings 60, 62. As is illustrated in FIG. 1, the belleville washer stacks 68, 70 on opposite sides of the driven gear 38 may have a different configuration or number of individual washers such that the pre-determined value of axial force required to overcome the spring force will be different for tension versus compression forces on the lead screw. The load limiting means of our invention can thus readily be fine-tuned to meet the exact requirements for maximum tensile or compressive loading of a given actuation system.

Figure 3:
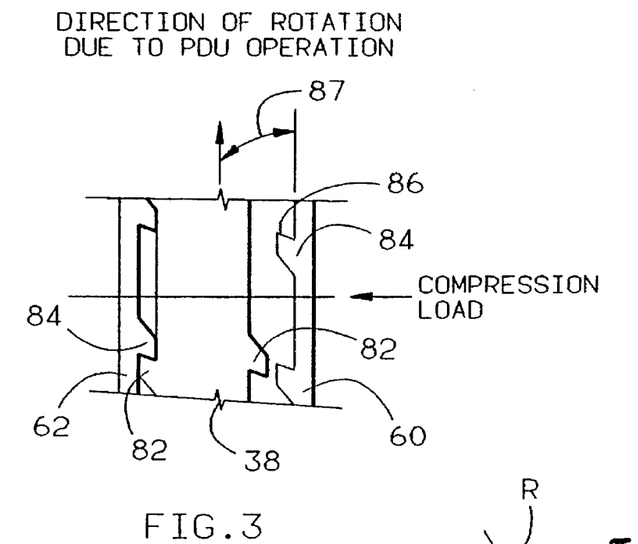
FIGS. 3–6 are roll-out views taken along section line A—A of FIG. 2, respectively illustrating the engagement of clutch teeth of the force limiting means responding to compressive forces in excess of the maximum force limit imposed by a jam in the actuation system, in FIGS. 3 and 4, and by the actuated element attempting to backdrive the input of the actuator, in FIGS. 5 and 6.
Figure 4:
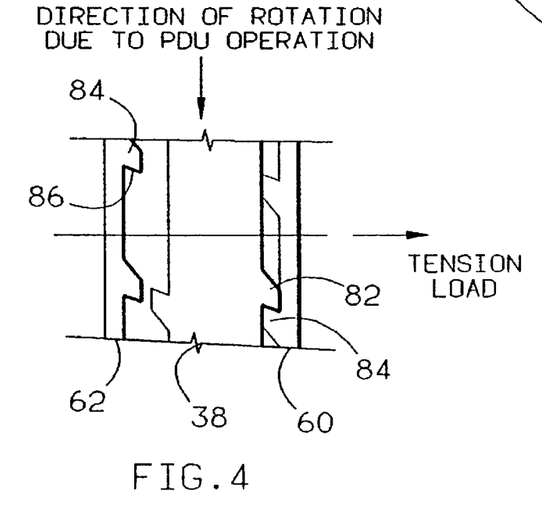

The juxtaposed axially facing surfaces of the driven gear 38 and the stop rings 60, 62 respectively include clutch teeth 82, 84. As shown in FIGS. 3 and 4, the clutch teeth 82, 84 have a front side thereof configured to provide complimentary negative rake angles 87 such that upon engagement of the front sides 86 of the clutch teeth 82, 84, resulting from axial movement of the lead screw 16 while the actuator 10 is receiving torque from the input shaft 26, the one or the other of the stop ring 60, 62 will be drawn toward the driven gear 38 along pin 64 to a fully engaged locked position whereat additional input torque applied to the input shaft 26 by the PDU will be reacted by the stop ring 60, 62 into the housing 24 to limit the force exerted by the actuator 10 on the control surface 50 and airframe 46. As used herein, the term "negative rake angle 87" refers to an included angle of less than 90°, such as 60°, measured between the front side 86 of a clutch tooth and the axial face of the driven gear 38 or the stop ring 60, 62 from which that tooth extends. As a result of the negative rake angle 88 of the teeth 84, 82, once the front sides of the teeth 82, 84 are fully engaged, the actuator 10 will remain locked against further input torque in the direction of engagement. In order to unlock the teeth 82, 84 of the force limiting means, the driven gear 38 must be driven in a direction opposite from the direction of rotation at engagement, by a reverse input torque applied by the PDU to the input shaft 26.

Figure 5:
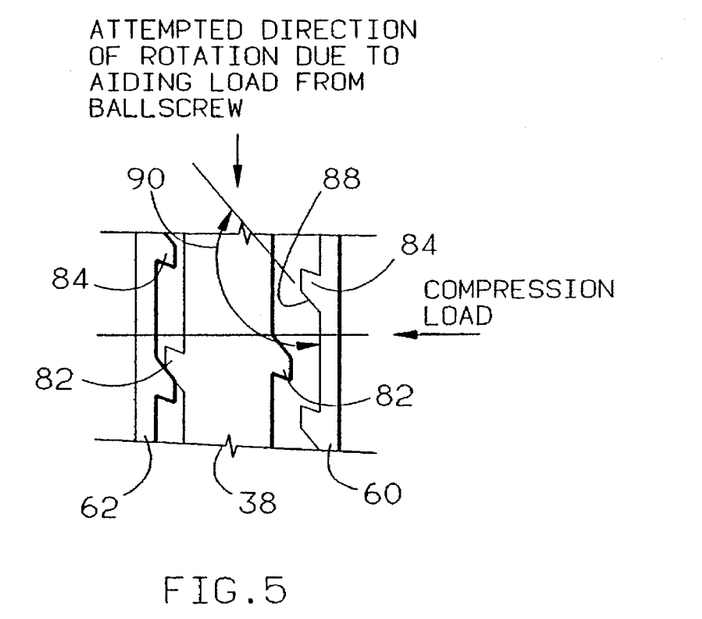
Figure 6:
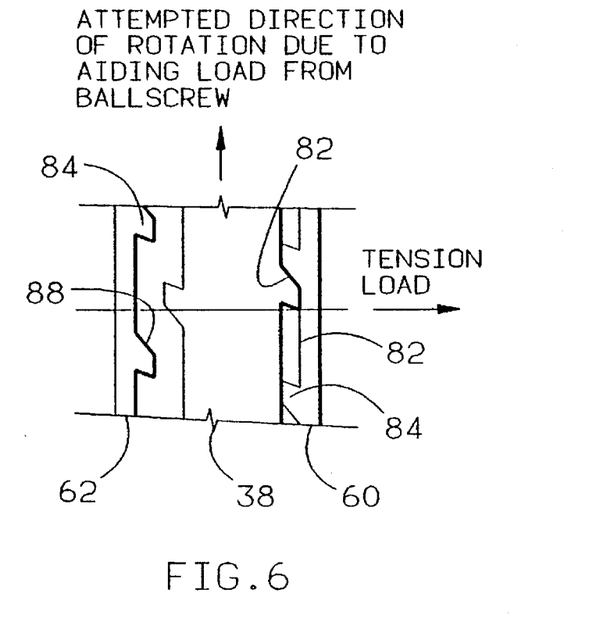

As shown in FIGS. 5 and 6, the clutch teeth 82, 84 further have a back-side 88 thereof configured to provide a positive rake angle 90, such that upon engagement of the back-sides 88 of the clutch teeth 82, 84 as a result of tension or compression loads exerted on the lead screw 16 by the ball nut 14, no lock-up of the clutch teeth 82, 84 will occur. As used herein, the term "positive rake angle" refers to an included angle between the back-side 88 of the clutch teeth 82, 84 and the axial surface from which a given tooth 82, 84 extends of greater than 90°. Back-side tooth engagement will normally occur only coincident with tension or compression loads on the lead screw 16 resulting from backdrive forces generated by the actuated member, such as, for instance, aerodynamic forces acting against the control surface 50. As previously described herein, however, the driven gear 38 is maintained in a normal position with respect to the lead screw 16 through the action of belleville washer stacks 68, 70. Should it be necessary to apply input torque and rotation to the driven gear 38 while the teeth 82, 84 are in back-side contact, however, the belleville washer stacks 68, 70 will allow the driven gear 38 to move axially for a short distance and rachet across the back-sides of adjacent teeth. Also, because the back-sides 88 of the teeth 82, 84 are configured with a positive rake angle 90, it is not necessary to reverse the input torque and rotation of driven gear 38 in order to release and reset the force limiting means once the axially tension or compression load is removed from the lead screw 16.

Thus when back-side tooth contact occurs as a result of tension or compression forces exceeding the maximum pre-determined value, while the actuator is not receiving input torque from the input shaft 26, the engagement of the teeth 82, 84 reacts the axially directed tension or compressive force above the pre-determined value experienced by the ball nut 14 directly into the housing 24, thereby preventing those tension or compressive forces from backdriving the input shaft 24 of the actuator 10 or causing further axial motion of the ball nut 14. By virtue of the shape of the front and back sides 86, 88 of the clutch teeth 82, 84 the force limiting means of our invention also provide a position holding function at tension or compression forces above the maximum pre-determined value.

As shown in FIG. 2, the friction drag means of the position holding means of our actuator include a stationary thrust bearing support 92 secured against rotation to the housing 24, and a rotating thrust bearing support 94 secured to the input shaft 26 for rotation therewith. Friction producing means, in the form of skewed roller thrust bearing 96, are disposed between the faying surfaces of the stationary and rotating thrust bearing support members 92, 94. Belleville springs 98 are operatively disposed between the input shaft 26 and the housing 24 for urging the rotating and stationary thrust bearing support members 92, 94 of the friction drag means into contact with the skewed roller thrust bearing 96.

Figure 7:
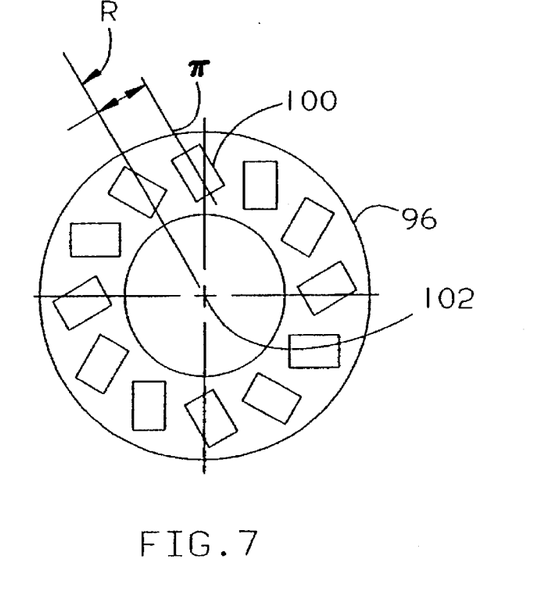
FIG. 7 illustrates a skewed roller thrust bearing, as viewed along line 7—7 in FIG. 2, which is utilized as a friction producing means in the position holding means of our invention.

As shown in FIG. 7, the skewed roller thrust bearing takes its name from the fact that the rollers 100 roll about axes r which do not extend along a radial line R passing through a center of rotation 102 of the skewed roller thrust bearing 96. Because the rollers 100 do not rotate about a radial extending line R, a combination of both sliding and rolling motion is imparted to the rollers 100 by virtue of relative rotation between the stationary and rotating thrust bearing supports 92, 94. While we wish to specifically point out that other types of friction producing devices or surfacing techniques can be used in practicing our invention, the skewed roller thrust bearing 96 is preferred because the co-efficient of friction generated between the thrust bearing 96 and the thrust bearing support surfaces 92, 94 remains relatively constant whether relative rotation exists between the stationary thrust bearing supports 92, 94 and the skewed roller thrust bearing 96. Thus, the static and dynamic friction torque generated by the friction drag means of our invention remains relatively constant under either static or dynamic loading, such that large breakaway torques are not encountered as would be the case with other types of friction producing devices.

Because the forced limiter and drag devices of our invention work together to provide the position holding function above the maximum force limit, the skewed roller thrust bearing 96 of our drag device can be made physically smaller than it would otherwise have to be in order to prevent backdriving of the actuator 10. Also, by judicious placement of the drag device of our invention to operate about the second axis directly on the input shaft 24 rather than about the first axis 22 and directly on the lead screw 22, we are able to utilize mechanical advantages and efficiencies provided in the gear train comprised of the driving and driven gears 34, 38, and between the ball nut 14 and lead screw 16 of the recirculating ball screw assembly 17 to further reduce the size of the drag device from what it would otherwise have to be if it were located to operate directly on the lead screw 16. Those skilled in the art will recognize that by virtue of utilizing a crossed-axis helical gear set, i.e. drive gear 34 and driven gear 38, the drag device of our invention can be made significantly smaller due to the inherent mechanical inefficiency of such a gear train arrangement. Specifically, the crossed-axis helical gear train of a preferred embodiment of our invention has a low mechanical backdriving efficiency in the range of about 20 to 30%. This low mechanical backdriving efficiency in combination with the input drag device of our invention allows our actuator to provide a position holding function at and below the force limiter engagement point without resorting to a large diameter drive gear 34 as has been utilized in prior actuators. Our actuator is thus more compact and less complex then prior actuators, making it ideal for applications such as the aircraft flight control surface actuation system of the exemplary embodiment in which small size and high reliability at low cost are required.

From the foregoing description, those skilled in the art will readily recognize that the actuator of our invention overcomes problems encountered in prior actuators, and in particular prior ball screw type actuators which were required to reliably provide both a load limiting and position holding functions at all potential axial load levels which might be imposed on the reciprocating output member of the actuator.

Those skilled in the art will further recognize that although we have described our invention herein with respect to certain specific embodiments and applications thereof, many other embodiments and applications of our invention are possible within the scope of our invention as described in the appended claims. For example, and as previously stated, friction producing means other than the skewed roller thrust bearing 96 of our preferred embodiment may also be used in practicing our invention. In other ball screw type actuators according to our invention, it may be advantageous to reverse the position and function of the ball nut 14 and the lead screw 16 of the recirculating ball screw device 17. In other words, although the ball nut 14 was utilized as the force transmitting reciprocating member of the exemplary embodiment described herein, and the lead screw 16 was utilized as the actuating member, in other actuators it may be more advantageous to have the ball nut 14 be journaled for rotation within the housing to function as the actuating member, and have the lead screw 16 function as the force transmitting recirculating member and be movable along the axis 22. The actuator 10 of our invention is also readily adaptable to applications other than an aircraft flight control surface actuation system in which small sized and high reliability achieved at low cost are required or desirable.

It is understood, therefore, that the spirit and scope of the appended claims should not be limited to the specific embodiments described and depicted herein.

We claim:

1. An actuator comprising:
   a force transmitting reciprocating output member drivingly carried by an actuating member mounted for rotation about an axis within a housing;
   a reversible torque input operatively coupled to said actuating member to cause said output member to translate along said axis in a direction dependent upon the direction of rotation of said input;
   force limiting means operatively connected between said actuating member and said housing for reacting input torque into said housing when axially directed tension or compression forces above a predetermined value are experienced by said output member, reverse rotation of said input torque resulting in the release and resetting of the force limiting means; and
   position holding means including friction drag means operatively connected between said input and said housing for imposing sufficient continuous friction drag torque on said input to prevent axially directed tension or compression forces experienced by said output member at or below said predetermined value from backdriving said input.

2. The actuator of claim 1 wherein said actuating member and said output are respectively a recirculating ball nut and a lead screw of a recirculating ballscrew assembly.

3. The actuator of claim 1 wherein said actuating member and said output are respectively a lead screw and a recirculating ball nut of a recirculating ballscrew assembly.

4. The actuator of claim 1 wherein said actuating member is slidably mounted in said housing.

5. The actuator of claim 1 wherein said force limiting means further includes:
   a reciprocating reaction plate secured for rotation with said actuating member;
   reaction plate engagement means having elements secured against rotation to said housing and disposed on either side of said reaction plate;
   said reaction plate engagement means including resilient means coupled to said elements for normally resiliently separating said elements from said reaction plate while allowing said elements to individually move towards and away from said reaction plate; and
   reaction plate positioning means operatively coupled between said actuating member and said housing whereby said tension or compression forces above said predetermined value experienced by said output member result in said reaction plate being deflected into engagement with one of the elements of said reaction plate engagement means.

6. The actuator of claim 5 wherein said reaction plate and said elements of the reaction plate engagement means include normally spaced apart matching sets of clutch teeth having complimentary negative rake angles such that upon an engagement of said clutch teeth of the reaction plate and said one of the elements while the actuator is receiving torque from said input, the reaction plate and the element are drawn axially toward one another, said engagement thereby reacting additional input torque into said housing to limit the force exerted by the output member.

7. The actuator of claim 5 wherein said reaction plate and said elements of the reaction plate engagement means include normally spaced apart matching sets of clutch teeth having complimentary positive rake angles such that upon an engagement of said clutch teeth of the reaction plate and said one of the elements while the actuator is not receiving input torque from said input, said engagement reacts the axially directed tension or compressive force above the predetermined value experienced by the output member into the housing, thereby preventing those tension or compression forces from backdriving the input of the actuator or causing further axial motion of the output member.

8. The actuator of claim 5 wherein said reaction plate and elements of the reaction plate engagement means include normally spaced apart matching sets of clutch teeth;
   said clutch teeth having a front side thereof configured to provide complimentary negative rake angles such that upon an engagement of said front sides of said clutch teeth of the reaction plate and said one of the elements while the actuator is receiving torque from said input, the reaction plate and the element are drawn axially toward one another, said engagement thereby reacting additional input torque into said housing to limit the force exerted by the output member; and
   said clutch teeth further having a back-side thereof configured to provide a positive rake angle such that upon an engagement of said back-side of said clutch teeth of the reaction plate and said one of the elements while the actuator is not receiving input torque from said input, said engagement reacts the axially directed tension or compressive force above the predetermined value experienced by the output member into the housing, thereby preventing those tension or compression forces from backdriving the input of the actuator or causing further axial motion of the output member.

9. The actuator of claim 5 wherein:
   said input includes an input shaft journaled for rotation in said housing and including integral therewith a drive gear having gear teeth; and said reaction plate is further configured as a driven gear having mating gear teeth in a gear mesh relationship with said gear teeth of said drive gear;

said input shaft and said drive and driven gears thereby providing said operative coupling between said input and said actuating member.

10. The actuator of claim 9 wherein said friction drag means of said position holding means includes:

a stationary member secured against rotation to said housing;

a rotating member secured to said input shaft for rotation therewith;

friction producing means disposed between faying surfaces of said stationary and rotating members; and resilient spring means operatively disposed between said input shaft and said housing for urging said rotating and stationary members of said friction drag means into contact with said friction producing means.

11. The actuator of claim 10 wherein said friction producing means is a skewed roller thrust bearing.

12. An actuator for converting a reversible rotating torque input into a linear force exerted by a force transmitting reciprocating output member of said actuator to thereby position an actuated element operatively attached to the reciprocating output member, with said actuator including:

force limiting means for reacting said input torque within said actuator in a manner preventing further exertion of said linear force on said actuated member whenever said reciprocating output member experiences tension or compressive forces in the direction of said linear motion that are above a predetermined value; and position holding means for preventing backdriving of said input by tension or compressive forces exerted on said output member by said actuated element at, above, or below said predetermined value.

13. The actuator of claim 12 wherein said position holding means are operatively configured to prevent backdriving of said input regardless of the presence or absence of said input torque, and further configured to automatically reset without the need for applying or reversing said input torque.

14. The actuator of claim 12 wherein said force limiting means are configured to engage only during application of said reversible torque input, and such that having engaged due to application of said torque input in one direction of rotation while said output member was experiencing tension or compressive forces above the predetermined value said torque input is locked against further rotation in said one direction of rotation, reverse rotation of said input torque being required for disengaging and resetting the force limiting means.

15. The actuator of claim 14 wherein said position holding means are operatively configured to prevent backdriving of said input regardless of the presence or absence of said input torque, and further configured to automatically reset without the need for applying or reversing said input torque.

16. An actuator comprising:

a force transmitting reciprocating output member drivingly carried by an actuating member mounted for rotation about an axis within a housing;

a reversible torque input operatively coupled to said actuating member to cause said output member to translate along said axis in a direction dependent upon the direction of rotation of said input;

force limiting means operatively connected between said actuating member and said housing for reacting input torque into said housing when axially directed tension or compressive forces above a predetermined value are experienced by said output member; and position holding means including friction drag means operatively connected between said input and said housing for imposing sufficient continuous friction drag torque on said input to prevent axially directed tension or compressive forces experienced by said output member at or below said predetermined value from backdriving said input.

\* \* \* \* \*